US012583023B2

(12) United States Patent
Crowe

(10) Patent No.: US 12,583,023 B2
(45) Date of Patent: Mar. 24, 2026

(54) METHODS TO SOLIDIFY CREMATION REMAINS

(71) Applicant: Parting Stone, Inc., Santa Fe, NM (US)

(72) Inventor: Justin D. Crowe, Santa Fe, NM (US)

(73) Assignee: Parting Stone, Inc., Santa Fe, NM (US)

( * ) Notice: Subject to any disclaimer, the term of this patent is extended or adjusted under 35 U.S.C. 154(b) by 1125 days.

(21) Appl. No.: 17/606,747

(22) PCT Filed: Apr. 23, 2020

(86) PCT No.: PCT/US2020/029645
§ 371 (c)(1),
(2) Date: Oct. 26, 2021

(87) PCT Pub. No.: WO2020/223113
PCT Pub. Date: Nov. 5, 2020

(65) Prior Publication Data
US 2022/0219211 A1 Jul. 14, 2022

Related U.S. Application Data

(60) Provisional application No. 62/905,146, filed on Sep. 24, 2019, provisional application No. 62/839,630, filed on Apr. 27, 2019.

(51) Int. Cl.
*B09B 3/25* (2022.01)
*A61G 17/08* (2006.01)
(Continued)

(52) U.S. Cl.
CPC ................ *B09B 3/25* (2022.01); *A61G 17/08* (2013.01); *B09B 3/35* (2022.01); *C04B 35/6261* (2013.01);
(Continued)

(58) Field of Classification Search
CPC .. A61G 17/08; B09B 3/25; B09B 3/35; B09B 3/40; B09B 5/00; B09B 2101/30;
(Continued)

(56) References Cited

U.S. PATENT DOCUMENTS

| 1,640,680 A | 8/1927 | Vanderlaan |
| 4,473,012 A | 9/1984 | Duran |

(Continued)

FOREIGN PATENT DOCUMENTS

| DE | 100 12 630 A1 | 8/2001 |
| GB | 449003 | 6/1936 |

(Continued)

OTHER PUBLICATIONS

*Animal Cremation Glass Paperweight—Memorial Stone—Animal Ashes Keepsake Glass—Cremation for Pets—Cremation Stone*, Etsy, Brooklyn, NY, accessed May 1, 2019 from https://www.etsy.com/listing/518054724/animal-cremation-glass-paperweight.

(Continued)

*Primary Examiner* — William L Miller
(74) *Attorney, Agent, or Firm* — Santa Fe IP, LLC

(57) ABSTRACT

A method to solidify cremation remains includes milling the cremation remains to a reduced particle size, adding water to the cremation remains to produce a mixture; shaping the mixture into wet ware having a desired shape, drying the wet ware to greenware that is sufficiently dry for firing, and firing the greenware in a kiln until solidified to one or more cremains solids consisting of the cremation remains. A product formed of solidified cremation remains is also disclosed.

12 Claims, 9 Drawing Sheets

(51) Int. Cl.

| | |
|---|---|
| *B09B 3/35* | (2022.01) |
| *C04B 35/626* | (2006.01) |
| *E04H 13/00* | (2006.01) |
| *B09B 101/30* | (2022.01) |
| *B28B 3/20* | (2006.01) |

(52) U.S. Cl.
CPC ........ *E04H 13/008* (2013.01); *B09B 2101/30* (2022.01); *B28B 3/20* (2013.01); *C04B 2235/36* (2013.01); *C04B 2235/6021* (2013.01); *C04B 2235/6027* (2013.01); *C04B 2235/606* (2013.01); *C04B 2235/6562* (2013.01); *C04B 2235/6567* (2013.01)

(58) Field of Classification Search
CPC ..... E04H 13/008; B28B 3/20; C04B 35/6261; C04B 2235/36; C04B 2235/6021; C04B 2235/6027; C04B 2235/606; C04B 2235/6562; C04B 2235/6567
See application file for complete search history.

(56) References Cited

U.S. PATENT DOCUMENTS

| | | | |
|---|---|---|---|
| 5,016,330 A | 5/1991 | Botsch | |
| D355,065 S | 1/1995 | Hicks | |
| D374,963 S | 10/1996 | Neuberger et al. | |
| 5,830,251 A | 11/1998 | Simpson et al. | |
| D437,250 S | 2/2001 | Hull et al. | |
| 6,200,507 B1 * | 3/2001 | Dennis .................. | E04H 13/008 264/331.19 |
| 6,213,751 B1 | 4/2001 | Schmidt | |
| 6,382,111 B1 | 5/2002 | Hojaji | |
| 6,615,463 B1 | 9/2003 | Hojaji | |
| 7,266,866 B2 | 9/2007 | Vogel et al. | |
| D617,973 S | 6/2010 | Clarke | |
| D690,894 S | 10/2013 | Simmons et al. | |
| 8,627,555 B2 * | 1/2014 | Kennedy ............. | C03C 17/3411 65/60.2 |
| 9,168,573 B2 | 10/2015 | Hojaji | |
| 9,700,923 B2 | 7/2017 | Camps | |
| 9,745,223 B2 | 8/2017 | Hojaji | |
| 9,763,846 B2 * | 9/2017 | Bisson ................... | A61G 17/08 |
| 10,905,616 B2 * | 2/2021 | Hatry ..................... | A61G 17/08 |
| D921,325 S * | 6/2021 | Crowe ............................. | D99/5 |
| 11,364,169 B2 * | 6/2022 | Hatry ..................... | A61G 17/00 |
| 11,470,839 B2 * | 10/2022 | Rubenstein ......... | A01M 31/004 |
| 11,950,666 B2 * | 4/2024 | Burton .................. | A61G 17/08 |
| 12,220,360 B2 * | 2/2025 | Russell .................. | C04B 28/04 |
| 12,371,372 B2 * | 7/2025 | Tottosi ................... | C04B 28/02 |

| | | | |
|---|---|---|---|
| 2002/0025392 A1 * | 2/2002 | Yardley et al. | |
| 2003/0154581 A1 * | 8/2003 | Jain ...................... | A61G 17/007 27/1 |
| 2005/0071964 A1 * | 4/2005 | Vogel ........................ | B09B 3/29 27/1 |
| 2006/0261512 A1 * | 11/2006 | Weisbrot .............. | A44C 17/006 264/234 |
| 2007/0000351 A1 | 1/2007 | Brennan | |
| 2008/0134575 A1 | 6/2008 | Strand et al. | |
| 2009/0077779 A1 * | 3/2009 | Zimmerman ....... | A61G 17/0166 110/341 |
| 2012/0245402 A1 | 9/2012 | Ross | |
| 2014/0013554 A1 | 1/2014 | Hojaji | |
| 2015/0209211 A1 * | 7/2015 | Savage .................. | A61G 99/00 27/1 |
| 2016/0250091 A1 * | 9/2016 | Bisson .................. | E04H 13/008 27/1 |
| 2016/0271660 A1 * | 9/2016 | Camps ...................... | B44C 5/00 |
| 2018/0343892 A1 * | 12/2018 | Rassman .............. | A61G 17/007 |
| 2019/0328601 A1 * | 10/2019 | Stokman ............ | A61G 17/0166 |
| 2020/0093673 A1 * | 3/2020 | Hatry ....................... | B44D 3/18 |
| 2020/0383861 A1 * | 12/2020 | Storts ................... | A61G 17/007 |
| 2024/0058848 A1 * | 2/2024 | Smith ........................ | B09B 3/10 |
| 2024/0309539 A1 * | 9/2024 | Ko ........................... | C30B 11/00 |
| 2025/0025914 A1 * | 1/2025 | Weng ....................... | B05D 7/24 |
| 2025/0100882 A1 * | 3/2025 | Ko ......................... | C04B 35/653 |

FOREIGN PATENT DOCUMENTS

| | | |
|---|---|---|
| JP | 01-304905 A | 12/1989 |
| JP | 10-167805 A | 6/1998 |
| JP | 11-209166 A | 8/1999 |
| JP | 2000-203930 A | 7/2000 |
| WO | WO 99/64369 A1 | 12/1999 |
| WO | WO 2004/066898 A1 | 8/2004 |

OTHER PUBLICATIONS

*Cremation beads an idea from South Korea*, Scattering Ashes, Newton Abbot, England, accessed May 1, 2019 from https://scattering-ashes.co.uk/different-cultures/cremation-beads-south-korea/.

*Cremation Memorial Palm Stone*, Bristol Blue Glass, Bristol, England, accessed May 1, 2019 from https://www.bristol-glass.co.uk/memorial-palm-stone.html.

Kim, Hyung-Jin, *South Korea's boon in cremation—and beads*, Associated Press, Dec. 4, 2011, accessed May 1, 2019 from https://www.sfgate.com/news/article/South-Korea-s-boon-in-cremation-and-beads-2345231.php.

* cited by examiner

PROCESSING APPARATUS

MILL

| PH TESTER | ACID SOURCE |
|-----------|-------------|

VESSEL

KILN

SHAPING APPARATUS

DRYING APPARATUS

| DRYING TABLE | DRYING BOX |
|--------------|------------|

TUMBLER

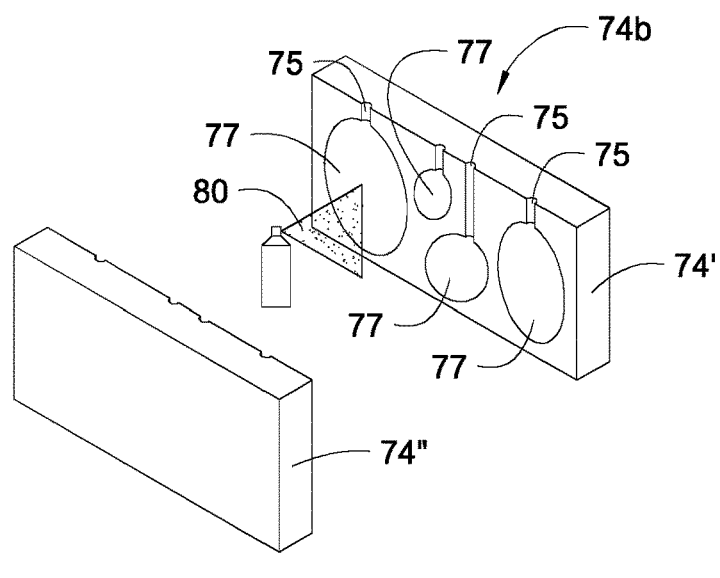
FIG. 9A
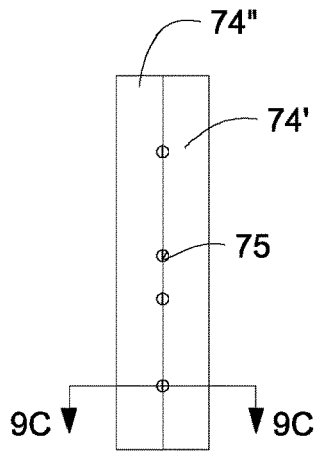
FIG. 9B
FIG. 9C
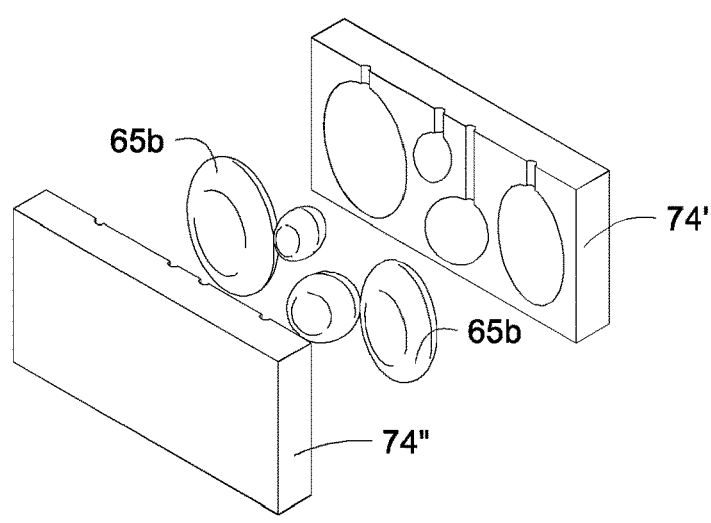
FIG. 9D

81

81

82

82

84

METHODS TO SOLIDIFY CREMATION REMAINS

CROSS-REFERENCES TO RELATED APPLICATIONS

This application is a National Stage of International Patent Application No. PCT/US2020/029645 filed Apr. 23, 2020 and published as WO 2020/223113 A1, which application claims priority to U.S. Provisional Patent Application No. 62/905,146 filed Sep. 24, 2019, and U.S. Provisional Patent Application No. 62/839,630 filed Apr. 27, 2019, the entire contents of which applications is incorporated herein by this reference.

BACKGROUND OF INVENTION

Field of Invention

This application relates, in general, to methods of solidifying cremation remains.

Description of Related Art

Cremation is common around the world and dates back centuries. Some choose cremation over burial or entombment for convenience or environmental reasons as it can be more practical to handle ashes instead of a body. Some choose cremation for cultural, religious or spiritual reasons. And some are simply more comfortable with an "ashes to ashes, dust-to-dust" approach as opposed to the thought of "decay". Regardless of the reasons, TIME magazine reported in 2016 that cremation is outpacing traditional burial in the U.S.

Cremation remains may be scattered at the request of the deceased at a location of their choosing. Or they may be buried or entombed, albeit in a smaller plot or chamber than a traditional burial. Otherwise, cremation remains are typically stored in closed containers such as a cremation urn or box. And in some instances, cremation remains may be combined with various additives to form various keepsakes or memorials. For example, U.S. Pat. No. 6,382,111 describes how cremation residues may be combined with various additives to form decorative objects.

Unfortunately, these options render, or may render, cremation remains wholly or partially irretrievable. For example, cremation remains that are scattered, buried or entombed are gone, that is, they are entirely lost or essentially inaccessible. If cremation urns or boxes are damaged, a portion of the cremation remains may be lost or undesirably mixed with other substances due to spillage. And it is likely impossible to again isolate cremation remains once they are mixed with additives.

It would therefore be useful to have methods of solidifying cremation remains that overcome the above and other disadvantages of known methods.

BRIEF SUMMARY

One aspect of the present invention is directed to a method to solidify cremation remains including: milling the cremation remains to a reduced particle size; adding water to the cremation remains to produce a claylike mass; shaping the claylike mass into wet ware having a desired shape; drying the wet ware to greenware that is sufficiently dry for firing; and firing the greenware in a kiln until solidified to one or more cremains solids consisting of the cremation remains.

The milling and adding may be accomplished by adding water to the cremation remains to form a slurry, milling the slurry to reduce particle size of the cremation remains suspended in the slurry, and drying the slurry to the claylike mass. The slurry may consist of approximately a 1:1 ratio of cremation remains to water. The milling and adding may be accomplished by milling the cremation remains while dry to reduce particle size of the cremation remains, and then adding water to the milled cremation remains to form the claylike mass.

The shaping may be accomplished by rolling or extruding the claylike mass into an elongated form, positioning the elongated form across a shaping apparatus and forming portions of the claylike mass into a plurality of objects, wherein the wet ware includes the plurality of objects. The shaping apparatus may be a ball-shaping apparatus having a pair of members with complementary groove pairs that pinch portions of the claylike mass into the groove pairs to form the plurality of objects within the groove pairs. The pair of members may be upper and lower plates, and the groove pairs are complementary and opposing parallel grooves on each of the upper and lower plates, and the shaping may be accomplished by positioning the elongated form across the parallel grooves, pressing the plates together to pinch the portions of the claylike mass into corresponding ones of the parallel grooves, and sliding the plates along one another in the direction of the parallel grooves to form the plurality of objects in corresponding ones of the parallel grooves. The pair of members may be parallel rollers, and the groove pairs are complementary and opposing circumferential grooves on each of the rollers, and the shaping may be accomplished by positioning the elongated form across between and on the rollers, whereby the rollers pinch the portions of the claylike mass into corresponding ones of the groove pairs to form the plurality of objects in corresponding ones of the groove pairs.

The shaping may be further accomplished by compressing at least one of the plurality of objects to provide the at least one of the plurality of objects with an organic shape. The drying may be accomplished by placing the wet ware on a drying table or in a drying box.

The firing may be accomplished by firing the greenware in the kiln until sintered with a vitrified surface. The firing may be accomplished by firing the kiln by ramping up the temperature about 200°/hour to a maximum temperature of about 2350° F., and holding the maximum temperature for about 45-60 minutes. The firing may be accomplished by firing in the kiln to a maximum temperature of about 2500° F. to 2700° F. The firing may be accomplished by holding a maximum temperature until the greenware softens to an organic shape.

The greenware may include a plurality of objects placed on one or more shelves within the kiln with each object spaced from adjacent objects. The greenware may include a plurality of objects, and wherein the firing may be accomplished by placing the plurality of objects in a crucible and firing together in the kiln.

The method may further may calcining the cremation remains to remove impurities and carbon from the cremation remains.

Another aspect of the present invention is directed to a method to solidify cremation remains including: milling the cremation remains to a reduced particle size; adding water to the cremation remains to produce a claylike mass; shaping the claylike mass into wet ware by dividing the claylike mass into a plurality of objects, wherein the wet ware comprises the plurality of objects; drying the wet ware into greenware that is sufficiently dry for firing; and firing the greenware in a kiln until solidified to a plurality of cremains solids.

The shaping may be accomplished by rolling or extruding the claylike mass into an elongated form, positioning the elongated form across a shaping apparatus and forming portions of the claylike mass into the plurality of objects.

The milling and adding may be accomplished by adding water to the cremation remains to form a slurry, milling the slurry to reduce particle size of the cremation remains suspended in the slurry, and drying the slurry to the claylike solid. The milling and adding may be accomplished by milling the cremation remains while dry to reduce particle size of the cremation remains, and then adding water to the milled cremation remains to form the claylike solid.

The shaping apparatus may be a ball-shaping apparatus having a pair of members with complementary groove pairs that pinch portions of the claylike mass into the groove pairs to form the plurality of objects within the groove pairs. The pair of members may be upper and lower plates, and the groove pairs are complementary and opposing parallel grooves on each of the upper and lower plates, and the shaping may be accomplished by positioning the elongated form across the parallel grooves, pressing the plates together to pinch the portions of the claylike mass into corresponding ones of the parallel grooves, and sliding the plates along one another in the direction of the parallel grooves to form the plurality of objects in corresponding ones of the parallel grooves. The pair of members may be parallel rollers, and the groove pairs are complementary and opposing circumferential grooves on each of the rollers, and the shaping may be accomplished by positioning the elongated form across between and on the rollers, whereby the rollers pinch the portions of the claylike mass into corresponding ones of the groove pairs to form the plurality of objects in corresponding ones of the groove pairs.

The shaping may be further accomplished by compressing at least one of the plurality of objects to provide the at least one of the plurality of objects with an organic shape.

The firing may be accomplished by firing the greenware in the kiln until sintered with a vitrified surface. The plurality of objects may be placed on one or more shelves within the kiln with each object spaced from adjacent objects. The firing may be accomplished by placing the plurality of objects in a crucible and firing together in the kiln.

The plurality of cremains solids may consist of the cremation remains.

The milling and adding may be further accomplished by adding glass to the cremation remains, and wherein the plurality of cremains solids consist of the cremation remains and glass.

A further aspect of the present invention is directed to a method to solidify cremation remains including: milling the cremation remains to a reduced particle size; shaping the milled cremation remains into a desired shape; and firing the shaped cremation remains in an oven until solidified to one or more cremains solids consisting of the cremation remains.

The firing may be accomplished by firing the shaped cremation remains in the kiln until sintered. The firing may be accomplished by firing the kiln by ramping up the temperature about 200°/hour to a maximum temperature of about 2350° F., and holding the maximum temperature for about 45-60 minutes. The firing may be accomplished by firing in the kiln to a maximum temperature of about 2500° F. to 2700° F.

A product may be produced according to any of the above methods.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9A, FIG. 9B, FIG. 9C and FIG. 9D are exploded, top, cross-sectional and exploded views, respectively, of another exemplary shaping apparatus for shaping cremation remains in accordance with various aspects of the present invention, with FIG. 9C being a cross-section taken along line 9C-9C of FIG. 9B, and FIG. 9D being an exploded view of of the shaping apparatus with a plurality of objects formed therein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
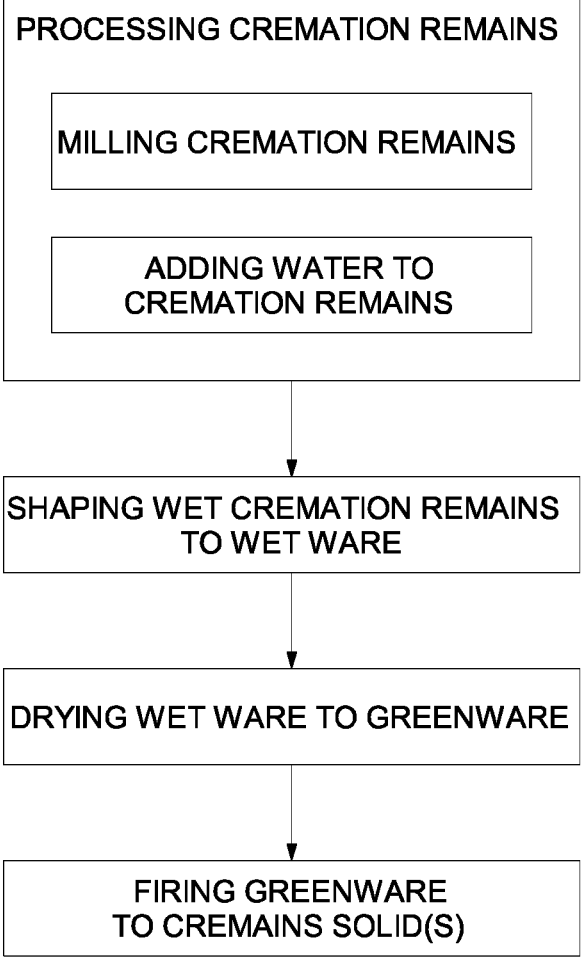
FIG. 1 is a flow diagram of an exemplary method to solidify cremation remains in accordance with various aspects of the present invention.
Figure 2:
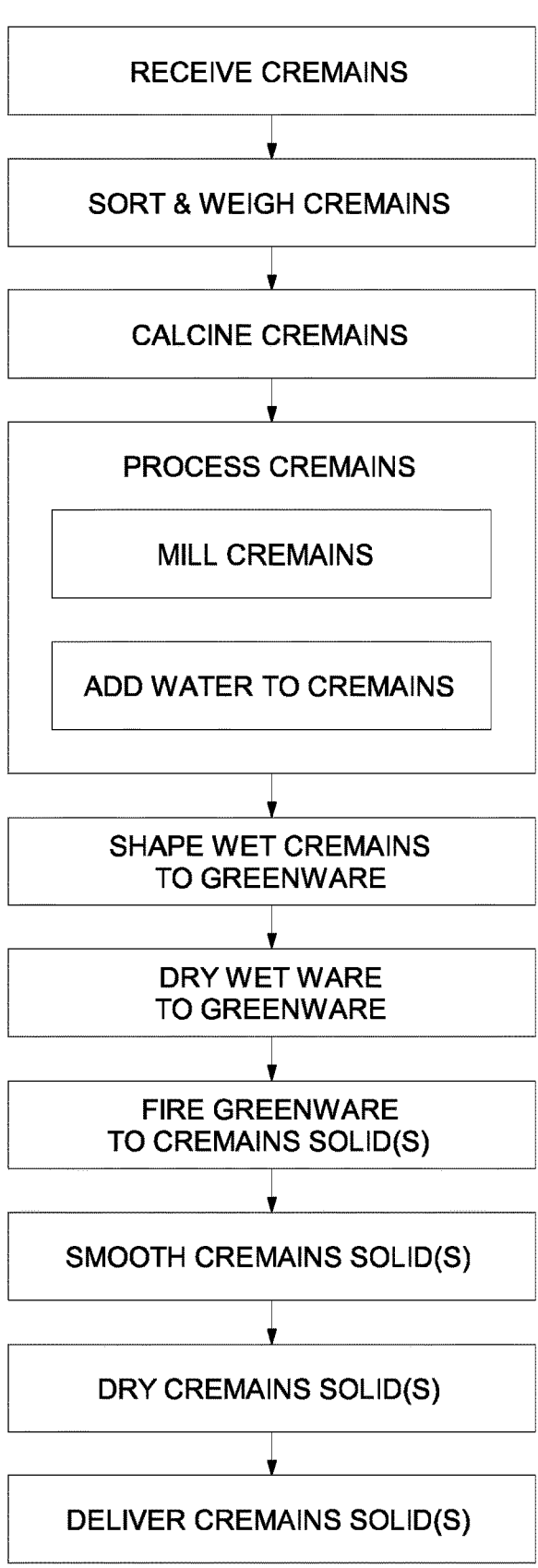
FIG. 2 is a flow diagram of an expanded exemplary method to solidify cremation remains in accordance with various aspects of the present invention.
Figure 3:
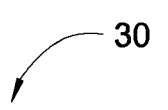
FIG. 3 is a schematic of an exemplary system for solidifying cremation remains in accordance with the present invention.

Turning now to the drawings, wherein like components are designated by like reference numerals throughout the various figures, an exemplary method to solidify cremation remains in accordance with various aspects of the present invention is illustrated in FIG. 1. An expanded exemplary method is shown in FIG. 2, and an exemplary system 30 that may be used in practicing the exemplary methods discussed herein is shown in FIG. 3.

The method generally includes the steps of milling the cremation remains to a reduced particle size, adding water to the cremation remains to produce a mixture, shaping the mixture into wet ware having a desired shape, drying the wet ware into greenware that is sufficiently dry for firing, and firing the greenware in a kiln until solidified to one or more cremains solids. In the case of forming a collection of cremains solids, the shaping step may further include the step of shaping the mixture into wet ware by forming a claylike mass into an elongated form, positioning the elongated form across a shaping apparatus and forming portions of the claylike mass into a plurality of wet ware objects. Alternatively, the shaping step may include shaping the mixture into wet ware by forming a slip, and pouring the slip into a slip mold to harden into a plurality of wet ware objects. For the purposes of the present application, "cremation remains" and "cremains" may be interchangeably used.

In various embodiments, the method begins with a solidified-cremains provider receiving cremation remains from a client. For example, a collection kit may be provided to a client to collect the cremains of a deceased family member and/or loved one. The client may be a funeral home or mortuary, or the client may be the survivor(s) of the deceased. The collection kit may include a container for the cremains and a return mailer for delivering to the cremains to the provider. The cremains may be delivered by any suitable means including hand delivery, USPS, UPS, and the like.

Once received by the provider, the cremains may be sorted accordingly and prepared for solidification. For example, the cremains may be placed in individual containers where they are safeguarded accordingly. The cremains may be weighed, recorded and otherwise documented as necessary to ensure process and quality control.

The cremains may be calcined to remove further impurities and/or carbon. While it is not essential to calcine the cremains, in many cases removing impurities and/or carbon to a greater extent generally provides for solidified remains of a more consistent and better quality.

In various embodiments, a kiln may be used to calcine the received cremains. For example, the received cremains may be put in a crucible or other suitable vessel, placed in a kiln, and then fired in the kiln with to a sufficiently high temperature and sufficient amount of heatwork to burn off impurities and/or carbon. For example, the kiln may be fired to temperatures greater than approximately 1800° F., more preferably greater than 1900° F., and most preferably greater than 2000° F. Alternatively, the kiln may be fired under appropriate heatwork protocols sufficient to burn off impurities and/or carbon. Pyrometric cones are well known to bend in a repeatable manner to measure temperature uniformity and heating protocols. And "cones" are widely understood to indicate specific temperature protocols specifying temperature uniformity and/or sufficient heatwork within a kiln, with or without the use of pyrometric cones. In accordance with various aspects of the present invention, a kiln may be fired to "cone 04", or more preferably fired to "cone 1" to calcine the received remains.

For reference, cone 04 and other applicable cone temperatures and heating rates are provided in the table below.

| Temperature Equivalent Chart for Orton Self Supporting Pyrometric Cones (° F.) | | | |
| --- | --- | --- | --- |
| Heating Rate | 27° F./Hour | 108° F./hour | 270° F./hour |
| Cone 05 | 1870 | 1888 | 1911 |
| Cone 04 | 1915 | 1945 | 1971 |
| Cone 03 | 1960 | 1987 | 2019 |
| Cone 02 | 1972 | 2016 | 2052 |
| Cone 01 | 1999 | 2046 | 2080 |
| Cone 1 | 2028 | 2079 | 2109 |
| Cone 2 | 2034 | 2088 | 2127 |

One will appreciate that other temperature ranges and/or other heatwork protocols may be utilized to calcine the remains in accordance with the present invention. For example, one will appreciate that a kiln may even be fired to "cone 10" or higher to calcine the remains.

In accordance with various aspects of the present invention, the cremation remains may be milled to a reduced particle size. Milling not only provides a finer particle size but ensures greater uniformity in particle size, which in turn facilitates processing, provides a more uniform material and, ultimately, provides an esthetically-pleasing cremains solid. Milling may be accomplished with ball mills, attrition mills, grinding mills, and/or other suitable means for crushing and/or grinding the cremains to a reduced particle size. In various embodiments, the cremation remains are sufficiently reduced in particle size when they can pass through 180-mesh sieve, more preferably through a 200-mesh sieve, and most preferably through a 220-mesh sieve. In various embodiments, the cremation remains may be milled much finer, for example, to approximately 20-30 microns, in which case, the remains are sufficiently reduced in particle size when they can pass through a 450-mesh sieve, more preferably a 500-mesh sieve, and most preferably through a 600-mesh sieve.

Figure 4:
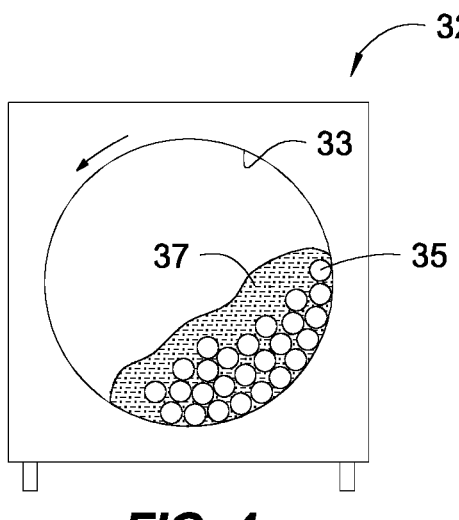
FIG. 4 is a schematic of an exemplary mill for milling cremation remains in accordance with various aspects of the present invention.

In various embodiments, the cremation remains may be milled using a ball mill. As shown in FIG. 4, a ball mill 32 typically includes a rotating barrel 33 partially filled with balls 35 that, through rotation of the barrel, rise and fall to reduce particle size of the cremains through impact and attrition.

For milling, the cremains may be mixed with an appropriate amount of water to form a paste or slurry 37, and then placed in the ball mill to be milled in an otherwise conventional manner. It has been shown that a 1:1 ratio of cremains to water is particularly well suited for milling cremains in a ball mill, however, one will appreciate that other ratios might be utilized. One will further appreciate that the cremains and the water may be added to the ball mill separately. In such cases, the appropriate amount of water may be calculated based upon the weight of the remains, which weight may be determined when the remains are first received by the provider, or following calcining if the remains are calcined.

Milling the cremains with a ball mill typically takes between 24 to 48 hours. Preferably, the milling process is periodically monitored because the actual amount of time to adequately reduce particle size will vary depending upon the amount of remains. For example, the cremains of a 200-pound adult may take up to 48 hours, whereas the remains of a smaller adult, teen, child or pet may take less time. Once the cremains are sufficiently milled, the balls are removed from the ball mill, and the milled slurry may be transferred to a plaster trough or other suitable vessel, in which the slurry may be dried to a claylike mass that has sufficient plasticity allowing it to be manipulated while maintaining its shape without cracking or sagging, which thus facilitates subsequent shaping. This drying process may take about 6 to 48 hours depending upon the volume of the slurry as well as ambient temperature and humidity. Blowers, fans, and/or other convective means may be utilized to speed the drying process.

In other embodiments, the cremation remains may be milled using an attrition mill. Attrition milling is generally faster than ball milling, and attrition milling generally does not require the addition of water prior to milling.

Figure 5:
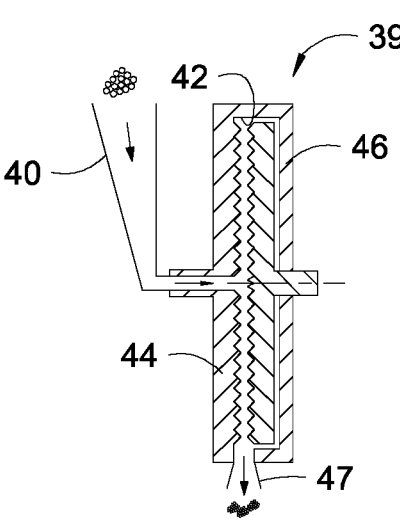
FIG. 5 is a schematic of another exemplary mill for milling cremation remains in accordance with various aspects of the present invention.

An exemplary attrition mill 39 is shown in FIG. 5 and includes an input feed 40 which directs the to-be-milled cremains into a milling chamber 42 between a stationary grinding disk 44 and a rotating grinding disk 46. Once the cremains are reduced to a sufficiently small particle size, the reduced-size cremains may exit through the gap between the stationary and rotating disks through the discharge 47 into a suitable vessel. One will appreciate that various types of attrition mills may be used such as single-wheeled disk mills (FIG. 5), double-wheeled disk mills, vibrating disk mills, vertically-disposed rotor mills, Buhr mills, and other suitable means to reduce particle size.

Attrition mills often do not require the milled particles be mixed with water or suspended in a fluid. When the cremains are milled "dry", the reduced-size cremains particles may be subsequently mixed with water in order to provide a claylike mass, or to provide a slurry that can be dried to a claylike mass. In either case, having the cremains in a claylike mass facilitates subsequent shaping.

In still further embodiments, the cremation remains may be milled using a grinding mill, such as the SWECO Vibro-energy Grinding Mills provided by SWECO of Florence, Ky. Similar to the attrition mills described above, grinding mills are generally faster than ball mills, and grind milling generally does not require the addition of water prior to milling.

Figure 6:
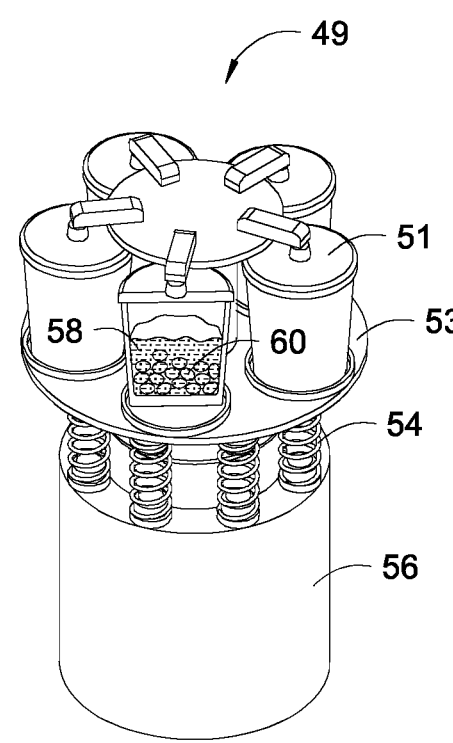
FIG. 6 is a schematic of another exemplary mill for milling cremation remains in accordance with various aspects of the present invention.

An exemplary vibratory grinding mill 49 is shown in FIG. 6 and includes one or more containers 51 that are clamped down to a vibratory platform 53, which platform is vibrationally supported on springs 54 and a vibrator base 56. Each container may be filled with dry cremation remains 58 and grinding media 60. The vibrator base may be then activated to drive the platform and the container(s) mounted thereon whereby the grinding media reduces the particle size of the cremation remains by impact and attrition forces generated by the grinding media within the container(s) in an otherwise conventional manner. One will appreciate that such a grinding mill may also be capable of milling cremation remains suspended in a slurry. Although a multi-container grinding mill is illustrated, one will appreciate that a single annular-chamber grinding mill may also be utilized.

In various embodiments, the cremains may be mixed with water and partially dried to a claylike mass having a claylike consistency and plasticity, the cremains may be processed into one or more pieces of pre-kiln wet ware having the desired shapes of the ultimate products. In other embodiments, the cremains may be mixed with water to form a slip that may be slip molded to form one or more pieces of pre-kiln wet ware substantially having the desired shapes of the ultimate products. For the purposes of the present invention, "wet ware" not only refers to a claylike mass having a claylike consistency and plasticity that may be readily shaped, but may also refer to a "leather-hard" mass that has been partially dried to the point where substantially all shrinkage has occurred, but where the mass may still be shaped to some degree. Thus, "wet ware" would generally encompass both "wet" and "leather-hard" ceramic objects but not "greenware" ceramic objects.

Figure 10A:
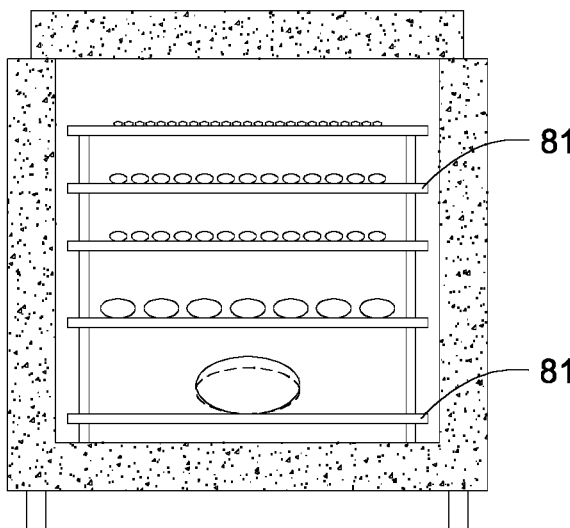
FIG. 10A, FIG. 10B and FIG. 10C are cross-sectional views of a kiln for firing cremation remains into one or more solid objects in accordance with various aspects of the present invention.

In various embodiments, the claylike mass may be shaped into a single piece of wet ware that will ultimately become a single large cremains solid in the form of a larger memorial object, or the claylike mass may be processed into a plurality of smaller pieces of wet ware that will ultimately become a collection of cremation solids, such as that shown in FIG. 10.

Preferably the wet ware is of organic shapes, that is, irregular or asymmetrical and curvy in appearance and tending to appear of the natural world. One will appreciate that, if desired, the claylike mass may be formed into various geometric shapes including spheres, pyramids, cubes and other regular solids (e.g., tetrahedrons, hexahedrons, octahedrons, etc.), as well as other three-dimensional forms. The wet ware shapes may be formed by hand, using molds in an otherwise conventional manner, or using various shaping devices as described below.

Figure 7A:
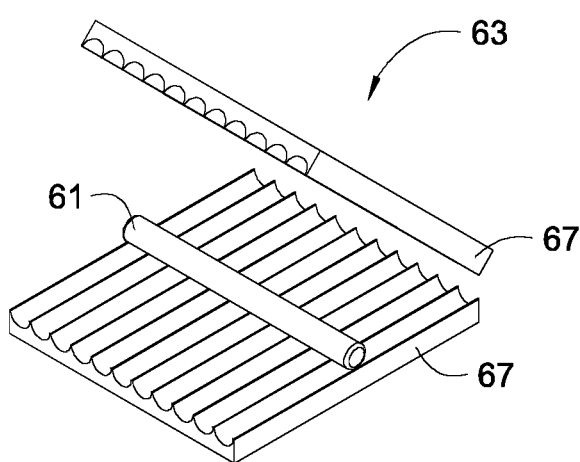
FIG. 7A, FIG. 7B and FIG. 7C are perspective views of an exemplary shaping apparatus for shaping cremation remains in accordance with various aspects of the present invention.
Figure 7B:
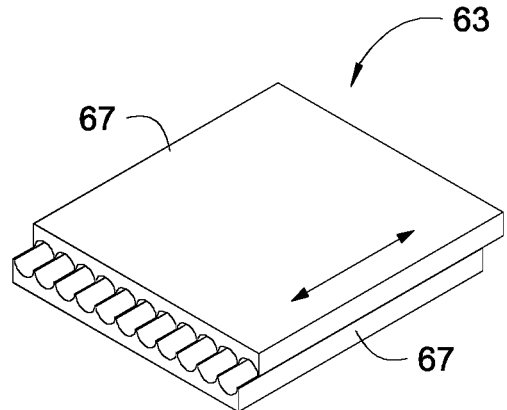
Figure 7C:
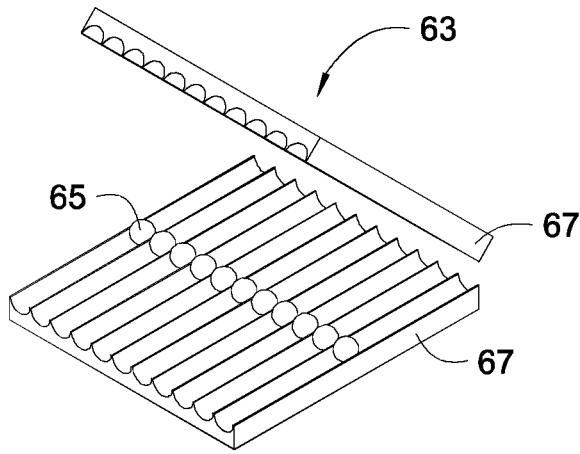

With reference to FIGS. 7A-7C, the claylike mass may be shaped by rolling or extruding the claylike mass into an elongated form 61, positioned across an exemplary shaping apparatus 63 (FIG. 7A), pinched and rolled within the shaping apparatus (FIG. 7B) to form the claylike mass into a number of smaller objects 65 (FIG. 7C). As shown in FIG. 7A, shaping apparatus 63 may be a ball-shaping apparatus including a pair of members 67 having complementary grooves in which portions of the elongated form are pinched into correspondingly aligned groove pairs to form smaller objects within each of the groove pairs.

In the illustrated embodiment, the pair of members 67 are upper and lower plates, and the groove pairs are complementary and opposing parallel grooves on each of the upper and lower plates. Shaping is accomplished by positioning elongated form 61 across the parallel grooves (FIG. 7A), pressing the plates together to pinch the portions of the claylike mass into corresponding ones of the parallel grooves (FIG. 7B), and sliding the plates along one another in the direction of the parallel grooves (FIG. 7B) to form smaller objects 65 in corresponding ones of the parallel grooves (FIG. 7C).

Figures 8A, 8B, 8C:
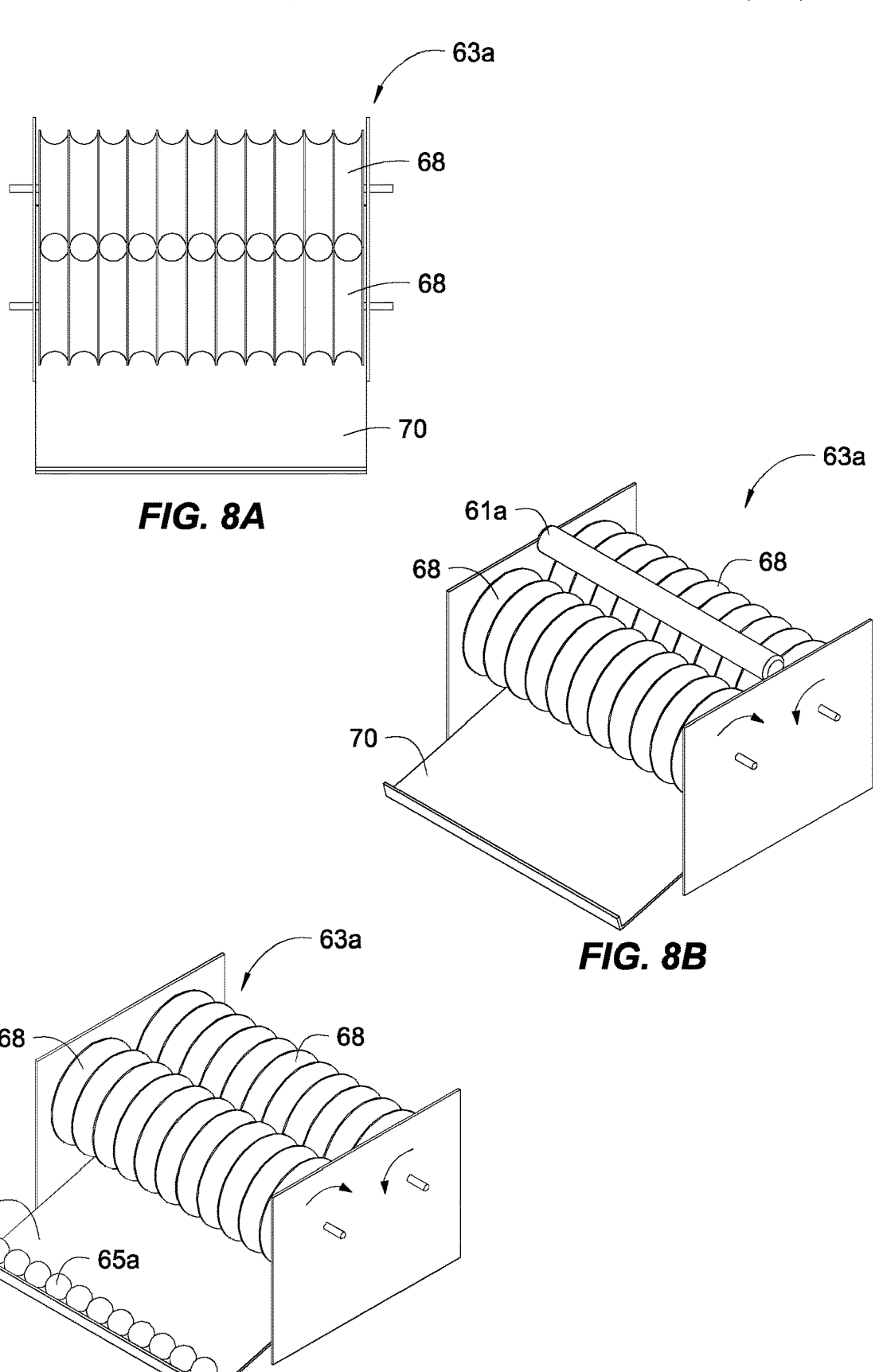
FIG. 8A, FIG. 8B and FIG. 8C are top and perspective views of another exemplary shaping apparatus for shaping cremation remains in accordance with various aspects of the present invention.

In other embodiments, and with reference to FIGS. 8A-8C, elongated form 61 may be positioned across another exemplary shaping apparatus 63a in order to form a number of smaller objects (FIG. 8C). As shown in FIG. 8A, the shaping apparatus may be a ball-shaping apparatus having a pair of rollers 68 with complementary grooves extending around the circumference of each roller. As shown in FIG. 8B, the rollers rotate toward one another in the direction of the arrows. When elongated form 61a is placed on and between the rollers, the rotation of the rollers pulls elongated form 61a downwardly such that sections are pinched between the rollers and into correspondingly aligned groove pairs to form smaller objects 65a within each of the groove pairs, and the smaller objects fall from the rollers onto a tray 70 as shown in FIG. 8C.

In the illustrated embodiments, the plates and rollers of the shaping apparatus have grooves with a semicircular profile which provide the resulting smaller wet ware objects with substantially spherical shapes. One will appreciate that the groove profiles may have other shapes resulting in wet ware objects of other three-dimensional shapes. For example, the grooves may be rectilinear to provide cylindrical-shaped wet ware objects, elliptical to provide ellipsoid-shaped wet ware objects, and so on. In order to provide a more organic form, the spherical, cylindrical or ellipsoid objects may be compressed to provide an organic shape. Such compression may simply be accomplished by manually pinching the smaller objects, or it may be accomplished with a mechanical press. Alternatively, the grooves of the shaping apparatus may be configured to provide a more organic shape. For example, the grooves may be formed with compound curves and/or irregular profiles to provide a desired shape. One will appreciate that the plates or rollers having such profiles may be formed with 3D printers and/or other additive manufacturing means, with CNC machines and/or other subtractive manufacturing means, or with a combination thereof.

Turning now to FIGS. 9A-9D, the cremains may be mixed with sufficient water to form a slip 72 having a creamy consistency and then poured into a slip mold 74 to form a plurality of objects 65b. As shown in FIG. 9A, the slip mold may have two mold halves 74' and 74" and one or more runners 75 extending into one or more respective cavities 77, through which slip is poured to fill the cavities, allowed to partially dry within the cavities to form respective ones of the objects. Once the slip has sufficiently dried, slip mold 74 may be opened to remove the cast objects 65b from the respective cavities 77, as shown in FIG. 9D. One will appreciate that any portions of the castings corresponding to the runners may be removed from the castings, and any such portions may be manually formed into another object so as to not waste any of the slip.

In various embodiments, the pH of the slip is determined and adjusted prior to molding. It has been found that slip having an elevated pH may lead to improper drying of the slip and/or tearing or ripping when the objects are removed from the slip mold. For example, it has been found that cremains slip having a pH in the range of 10.5 to 12, or higher, may lead to gelatinous and/or otherwise hydrophilic slip that does not properly dry during the slip molding process, and/or may lead to ripping or tearing when the objects are demolded, which may undesirably leave bits of slip in the slip-mold cavities. It has been determined that reducing the pH of the cremains slip alleviates such issues.

Accordingly, the pH of the slip may be determined in an otherwise conventional manner, and the pH may be reduced to a range of approximately 6-12, more preferably to a pH range of approximately 7.5 to 10.5, and most preferably to a pH of approximately 9. An acid may be added to the cremains slip to reduce the pH accordingly. Preferably, organic acids including carboxylic acids are used to lower the pH, including but not limited to acetic acid, citric acid, lactic acid, uric acid and/or other organic acids. One will appreciate that other suitable acids may be used to lower pH.

In various embodiments, fiber may be added to the slip in order to strengthen the cast objects. For example, fiber may be added to the slip to help prevent the cast objects from tearing or ripping during the demolding process. In addition, such fiber may also quicken or otherwise facilitate the drying process during slip molding. Preferably natural fibers are utilized such as plant fibers, and more preferably paper fibers. Such fibers are natural, organic, and will readily burn out during firing. One will appreciate that other types of fibers may be utilized to provide a strengthening matrix and/or otherwise reinforce the cast objects to facilitate the demolding process. Preferably the amount of fiber added to the slip is no more than approximately 1% by volume or approximately 1% by weight, and more preferably no more than approximately 0.5% by volume or approximately 0.5% by weight.

In various embodiments, a release agent 79 may be applied to the cavities of slip mold 74 prior to filling the slip mold with slip 72 in order to further facilitate removal of cast objects 65b from the slip mold. For example, corn starch may be applied by spraying the inner wall surfaces of cavities 77 to help release the cast objects from the slip mold cavities. Corn starch is particularly well suited for such a release agent as it is organic and it generally burns out during firing. One will appreciate that other release agents may be used in accordance with the present invention such as baby powder, talcum powder, talc, clay minerals, and/or other suitable materials.

In addition to the slip molding and other shaping processes described above, one will appreciate that a wide variety of shaping devices and machines, both manual and automated, may be utilized to shape the claylike mass into one or more wet ware objects of various shapes and sizes. For example, press molds and other types of molds may be used, as well as various dough-shaping devices and machines.

Once the wet ware is shaped as desired, it must be sufficiently dried into greenware for firing. Drying may be accomplished by simply placing the wet ware on a drying table and allowed to dry in ambient room temperature. Alternatively, the wet ware may be placed in a dry box with circulating air, or other device to dry under controlled conditions in an otherwise conventional manner. Drying may take between about 2 to 12 hours depending upon the size of the wet ware objects as well as ambient temperature and humidity. Again, blowers, fans and/or other convective means may be utilized to speed the drying process.

Various ceramic and pottery techniques may be utilized to determine when the wet ware has sufficiently dried into greenware suitable for firing. For example, a skilled artisan may determine that the greenware is sufficiently dry for firing when it is no longer cold to the touch. A skilled artisan may also determine sufficient dryness based upon the color change from wet ware to greenware. Alternatively, digital moisture meters or other suitable means may be utilized.

In other embodiments, the wet ware may be dried directly in a kiln. For example, the shaped wet ware may be placed in a kiln, and then "candled" in the kiln to drive undesired moisture from the wet ware thus turning it to greenware. For example, a candle schedule may heat the kiln at 50-100° F./hour to between 150-220° F. and held at temperature for 2 to 8 hours, or heated at 100° F./hour to 180° F. and held at temperature for 6 hours.

Once the wet ware is sufficiently dried to greenware, it may be fired in a kiln until solidified to one or more cremains solids. The greenware may be placed directly on one or more shelves 81 of the kiln (FIG. 10A), or the greenware may be placed in a crucible 82 or other suitable vessel (FIG. 10B), or the greenware may be buried in alumina hydrate 84 within a crucible or other suitable vessel (FIG. 10C).

Figure 10B:
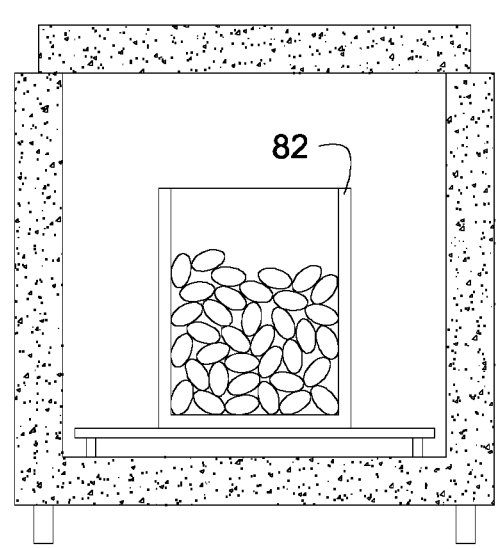

While a single crucible is illustrated in FIG. 10B, one will appreciate that multiple crucibles may be used depending upon various factors such as the amount of cremains, the size of the kiln, etc. Preferably each crucible is made of a refractory material, or is coated with a refractory material so that the greenware does not stick to the crucible. For example, the crucible may be coated with alumina hydrate prior to placing the greenware into or on the crucible. Similarly, any shelves in the kiln may be formed of, or coated with such a refractory material.

Figure 10C:
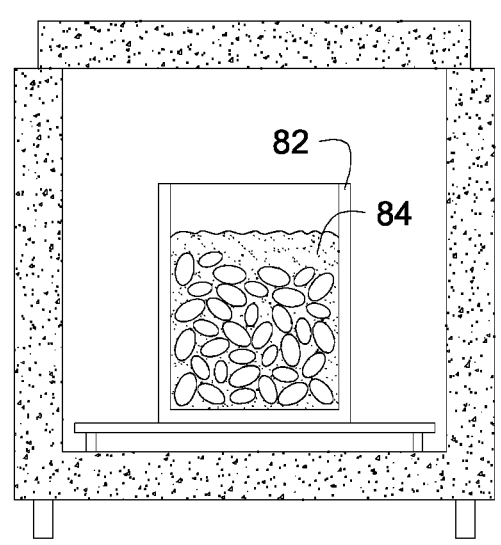
Figure 11:
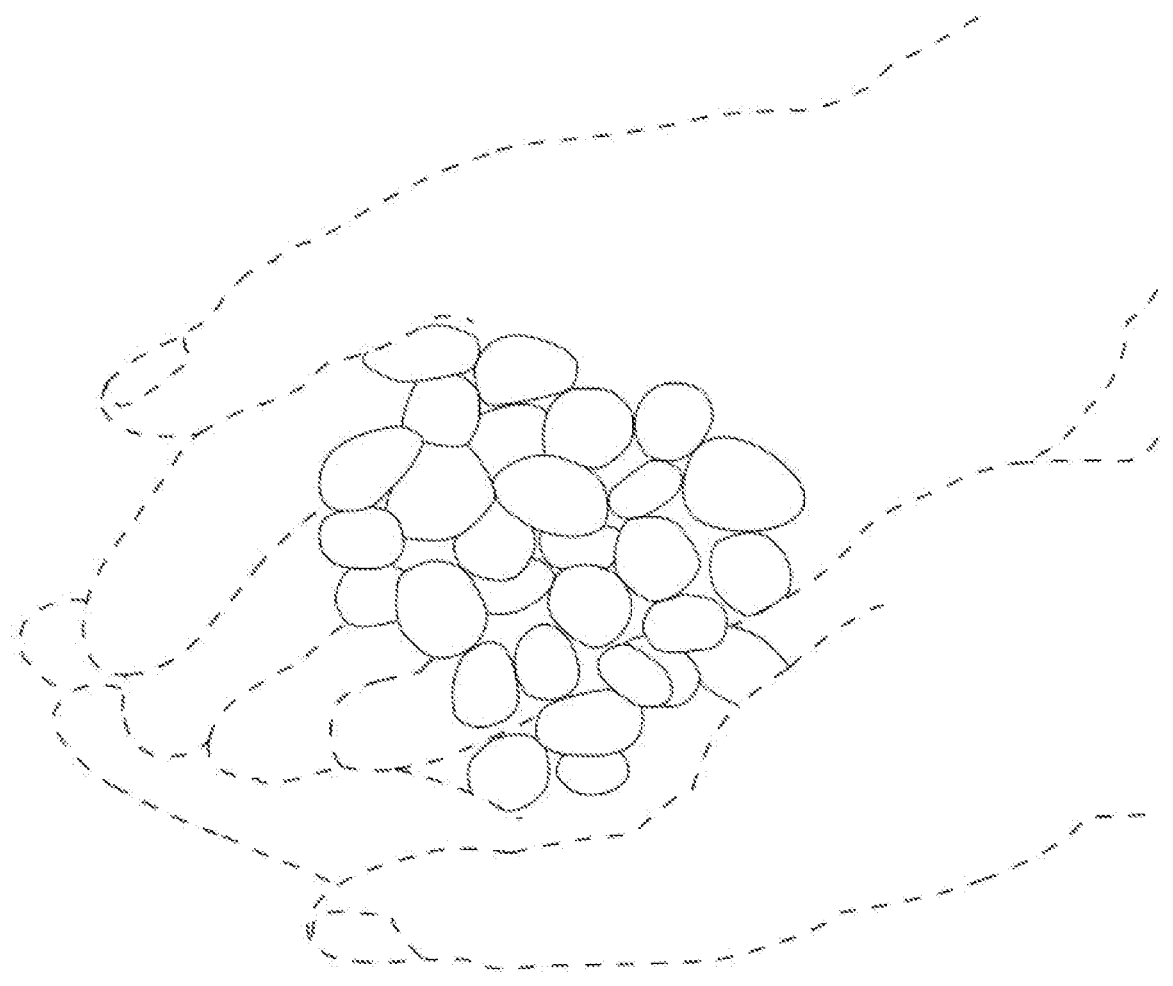
FIG. 11 is a perspective view of exemplary solidified cremation remains in accordance with various aspects of the present invention.

Turning to FIG. 10C, the greenware may be buried in alumina hydrate 84 to reduce surface bubbling of the greenware during the firing process. It has been found that on occasion cremains greenware will form surface bubbles during the firing process. Burying the greenware in alumina hydrate is believed to extract excess fluid and/or gas, namely excess water and/or air (or oxygen) from within the greenware to avoid such bubbling.

In one embodiment, the kiln is fired for approximately 7 hours, ramping up at about 200° F./hour to a temperature of about 2350° F., held at temperature for about 45-60 minutes, and then the kiln is allowed to cool. In other embodiments, the kiln may be fired to temperatures in the range of approximately 2500° F. to 2700° F. for 2-3 hours (or longer). In still other embodiments, the kiln may be ramped up to and held at 2350° F. for approximately 2 to 3 hours. One will appreciate that other firing protocols may be used to provide sufficient heatwork to solidify the greenware into solidified cremains solids. While kilns are particularly well suited for firing the cremated remains into solidified objects in accordance with the present invention, one will appreciate that other types of ovens may be utilized to provide the requisite heatwork to solidify the greenware into solids.

The resulting cremains solids preferably have a substantially uniform composition throughout. In various embodiments, the cremains solids are sintered solids that consist solely of the cremation remains. Preferably the surface of the cremation remains is substantially, if not completely, non-porous. One will appreciate that the surface layer of the cremation solids may be vitrified thereby reducing, if not eliminating, surface porosity.

While it is preferred that the greenware not melt to the point of runniness, one will appreciate that higher temperatures may allow sufficient vitrification to allow the greenware to slightly soften and misshapen, thus providing a more organic shape to the cremains solids. When a plurality of greenware objects are fired together in a crucible (e.g., FIG. 10B), the greenware should not vitrify to the degree that the objects stick together. Accordingly, if softening and misshaping is desired, it is preferred that the greenware objects are placed on one or more shelves and spaced from one another (e.g., FIG. 10A) to avoid contact during firing.

After the kiln has cooled and the cremains solids are removed from the kiln, the cremains solids may be further processed to smooth and/or polish the surface of the solids. For example, the solids may then be placed into a vibratory tumbler with an abrasive media for 12 to 24 hours. One will appreciate that actual times may vary depending upon the speed of vibration, the type of media, additives, water flow and other variable that may be employed reduce the amount of time necessary to produce the desired level of smoothness. One will also appreciate that other suitable means may be used to smooth and/or polish the cremains solids.

If necessary, the smoothed or polished cremains solids may undergo a final drying. Due to the reduced porosity of the cremains solids, the final drying is generally much quicker than the drying processes described above.

Lastly, the cremains solids may be inspected, appropriately packaged, and returned to the client.

In accordance with various aspects of the present invention, the cremation remains are mixed only with water to form a claylike mass that can be shaped as desired into wet ware. As the water is removed prior to firing, the resulting cremains solids consist solely of cremation remains. Advantageously, the volume of the cremains solids is minimized as there is no other matter present other than cremation remains. In the event that a client wishes to return the cremation remains to ashen or powdered form, the cremains solids may be subsequently ground or milled in accordance with various aspects of the present invention. The client may be assured that there is no foreign matter present in the once-again ashen or powdered cremation remains.

In other embodiments, the cremation remains may be mixed with glass prior to the shaping in order to produce cremains solids having a mixture of cremation remains and glass, which mixture may provide a more translucent quality to a collection of cremains solids. Instead of sintering cremation remains into a solid object as described above, lesser temperature firing protocols might be utilized in firing such "mixed" greenware as it may only be necessary to melt the glass with the cremation remains suspended therein. Such embodiments may also make use of the shaping processes described above, but such embodiments do not provide cremains solids consisting solely of cremated remains.

For convenience in explanation and accurate definition in the appended claims, the terms "upper" and "lower", etc. are used to describe features of the exemplary embodiments with reference to the positions of such features as displayed in the figures.

In many respects, various modified features of the various figures resemble those of preceding features and the same reference numerals followed by the subscript "a" designate corresponding parts.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method to solidify cremation remains, the method comprising:

milling the cremation remains to a reduced particle size;

adding water to the cremation remains to produce a mixture;

shaping the mixture into wet ware by dividing the mixture into a plurality of objects, wherein the wet ware comprises the plurality of objects;

drying the wet ware into greenware that is sufficiently dry for firing; and firing the greenware in a kiln until solidified to a plurality of cremains solids;

wherein the mixture is a claylike mass, and wherein the shaping is accomplished by rolling or extruding the claylike mass into an elongated form, positioning the elongated form across a shaping apparatus and forming portions of the claylike mass into the plurality of objects; and wherein the shaping apparatus is a ball-shaping apparatus having a pair of members with complementary groove pairs that pinch portions of the claylike mass into the groove pairs to form the plurality of objects within the groove pairs.

2. A method according to claim 1, wherein the pair of members are upper and lower plates, and the groove pairs are complementary and opposing parallel grooves on each of the upper and lower plates, and the shaping is accomplished by positioning the elongated form across the parallel grooves, pressing the plates together to pinch the portions of the claylike mass into corresponding ones of the parallel grooves, and sliding the plates along one another in the direction of the parallel grooves to form the plurality of objects in corresponding ones of the parallel grooves.

3. A method according to claim 1, wherein the pair of members are parallel rollers, and the groove pairs are complementary and opposing circumferential grooves on each of the rollers, and the shaping is accomplished by positioning the elongated form across between and on the rollers, whereby the rollers pinch the portions of the claylike mass into corresponding ones of the groove pairs to form the plurality of objects in corresponding ones of the groove pairs.

4. A method according to claim 1, wherein the shaping is further accomplished by compressing at least one of the plurality of objects to provide the at least one of the plurality of objects with an organic shape.

5. A method according to claim 1, wherein the firing is accomplished by firing the greenware in the kiln until sintered with a vitrified surface.

6. A method according to claim 1, the method further comprising determining the pH value of the mixture and adjusting the pH of the mixture to a range of approximately 6 to 12, wherein acid is added to the mixture to adjust the pH of the mixture downward.

7. A method according to claim 1, wherein the plurality of cremains solids consist of the cremation remains.

8. A method according to claim 1, wherein the milling and adding is further accomplished by adding glass to the cremation remains, and wherein the plurality of cremains solids consist of the cremation remains and glass.

9. A method to solidify cremation remains, the method comprising:

milling the cremation remains while dry to a reduced particle size of the cremation remains;

shaping the milled cremation remains into a desired shape; and firing the shaped cremation remains in an oven until solidified to one or more cremains solids consisting of the cremation remains.

10. A method according to claim 9, wherein the firing is accomplished by firing the oven by ramping up the temperature about 200° /hour to a maximum temperature of about 2350° F., and holding the maximum temperature for about 45-60 minutes.

11. A method according to claim 9, wherein the firing is accomplished by firing in the oven to a maximum temperature of about 2500° F. to 2700° F.

12. A product produced according to the method of claim 9, wherein the product is one or more cremains solids.

* * * * *